US010675570B2

(12) United States Patent
Wolff (10) Patent No.: US 10,675,570 B2
(45) Date of Patent: Jun. 9, 2020

(54) WATER TREATMENT APPARATUS, SYSTEM AND PROCESS (75) Inventor: Kyle Anthony Wolff, Ashmore (AU)

(73) Assignee: HYDRASYST PTY LTD, Queensland (AU)

(*) Notice: Subject to any disclaimer, the term of this patent is extended or adjusted under 35 U.S.C. 154(b) by 539 days.

(21) Appl. No.: 13/697,196

(22) PCT Filed: May 12, 2011

(86) PCT No.: PCT/AU2011/000552
§ 371 (c)(1),
(2), (4) Date: Jan. 15, 2013

(87) PCT Pub. No.: WO2011/140602
PCT Pub. Date: Nov. 17, 2011

(65) Prior Publication Data
US 2013/0126433 A1 May 23, 2013

(30) Foreign Application Priority Data
May 12, 2010 (AU) .................. 2010902029

(51) Int. Cl.
B01D 29/00 (2006.01)
B01D 29/66 (2006.01)
(Continued)

(52) U.S. Cl.
CPC .......... B01D 29/66 (2013.01); B01D 61/147 (2013.01); B01D 61/22 (2013.01); B01D 63/02 (2013.01);
(Continued)

(58) Field of Classification Search
CPC .... C02F 1/00; C02F 1/001; C02F 1/44; C02F 1/442; C02F 1/444; C02F 1/445; B01D 29/00; B01D 29/0002; B01D 29/0097; B01D 29/50; B01D 29/52; B01D 29/62; B01D 29/66; B01D 29/663; B01D 29/668; B01D 29/68
USPC ....... 210/600, 767, 805, 106, 108, 109, 116, 210/321.6, 321.72, 321.78, 3, 22, 323.1, 210/323.2, 332, 333.01, 348, 407, 408,
(Continued)

(56) References Cited

U.S. PATENT DOCUMENTS 3,613,888 A * 10/1971 Harris .................... B01D 24/24
210/274
4,253,962 A * 3/1981 Thompson ............. B01D 65/02
210/321.67
(Continued)

FOREIGN PATENT DOCUMENTS

DE 29724313 9/1998
EP 1704911 9/2006
(Continued)

Primary Examiner — Allison G Fitzsimmons
(74) Attorney, Agent, or Firm — Garvey, Smith & Nehrbass, Patent Attorneys, L.L.C.; Charles C. Garvey, Jr.; Vanessa M. D'Souza (57) ABSTRACT Water treatment apparatus, including: a ceramic filter; and a flow apparatus operable to pass water through the ceramic filter in a forward direction so as to filter the water, the flow apparatus also operable to pass water through the ceramic filter in a reverse direction so as to remove material from the ceramic filter, whereby material having been deposited by filtration of the water is removed.

18 Claims, 5 Drawing Sheets (51) Int. Cl.

| | | |
|---|---|---|
| *B01D 63/02* | (2006.01) | |
| *B01D 65/02* | (2006.01) | |
| *C02F 1/44* | (2006.01) | |
| *B01D 61/14* | (2006.01) | |
| *B01D 61/22* | (2006.01) | |
| *B01D 71/02* | (2006.01) | |
| *C02F 1/00* | (2006.01) | |
| *C02F 1/32* | (2006.01) | |
| *C02F 1/66* | (2006.01) | |
| *C02F 1/78* | (2006.01) | |
| *C02F 1/28* | (2006.01) | |
| *C02F 103/00* | (2006.01) | |

(52) U.S. Cl.
CPC ........... *B01D 65/02* (2013.01); *B01D 71/024* (2013.01); *C02F 1/444* (2013.01); *B01D 2311/103* (2013.01); *B01D 2313/22* (2013.01); *B01D 2313/243* (2013.01); *B01D 2313/48* (2013.01); *B01D 2313/90* (2013.01); *B01D 2315/18* (2013.01); *B01D 2321/04* (2013.01); *C02F 1/008* (2013.01); *C02F 1/283* (2013.01); *C02F 1/32* (2013.01); *C02F 1/66* (2013.01); *C02F 1/78* (2013.01); *C02F 2103/002* (2013.01); *C02F 2209/005* (2013.01); *C02F 2209/02* (2013.01); *C02F 2209/06* (2013.01); *C02F 2209/40* (2013.01); *C02F 2303/04* (2013.01); *C02F 2303/16* (2013.01); *C02F 2303/24* (2013.01)

(58) Field of Classification Search
USPC ............ 210/416.1, 420, 4, 27, 433.1, 500.1, 210/500.21, 500.23
See application file for complete search history.

(56) References Cited

U.S. PATENT DOCUMENTS

| | | | | |
|---|---|---|---|---|
| 4,636,307 | A | * | 1/1987 | Inoue ................. B01D 19/0031 210/188 |
| 5,348,647 | A | | 9/1994 | Chen |
| 6,027,649 | A | * | 2/2000 | Benedek ................ B01D 61/16 210/321.78 |
| 2003/0136737 | A1 | | 7/2003 | Glynn |
| 2004/0007525 | A1 | * | 1/2004 | Rabie ..................... B01D 61/18 210/636 |
| 2004/0168989 | A1 | * | 9/2004 | Tempest, Jr. .............. C02F 1/78 210/760 |
| 2008/0052094 | A1 | * | 2/2008 | Morfopoulos et al. ........... 705/1 |
| 2008/0128356 | A1 | | 6/2008 | Sieh |

FOREIGN PATENT DOCUMENTS

| | | | | |
|---|---|---|---|---|
| EP | 2340100 | A2 * | 7/2011 | ......... C04B 38/0003 |
| FR | 2928366 | | 9/2009 | |

* cited by examiner

WATER TREATMENT APPARATUS, SYSTEM AND PROCESS

TECHNICAL FIELD

Described embodiments relate generally to a water treatment apparatus. Particular embodiments relate to grey water recycling apparatus.

BACKGROUND

Recycling, reuse or reticulation of water is increasingly important in making economical use of clean water supplies and in minimising pollution.

Grey water recycling is a common application of water recycling. Grey water recycling generally involves treating any water from commercial, business, or residential premises, excluding water from toilets or kitchens. Grey water generally carries contaminants such as dirt, mud, sand, fibre, detergents, phosphates, salts, organic chemicals and organic materials such as pathogens, bacteria, and virus from human or animal contact.

Recycling grey water presents particular problems. One problem is obtaining maximum recycle rates or rates which are high enough to justify the cost and/or space and energy used by the recycling apparatus. Another problem is the variety and levels of materials and contaminants that need to be removed from grey water before it can be reused or recycled. Combined with the first problem, this presents a significant challenge. Other problems relate to grey water recycling apparatus often needing to be on-site where maintenance staff are often not on hand to provide maintenance of the apparatus.

One approach to recycling water in general, but grey water specifically, uses a ceramic membrane, such as a membrane made of $AlO_3$ to filter water. This type of filter can remove a wide range of contaminant. However, apparatuses taking this approach often require a large footprint. Also, they can suffer limitations in flux per square metre of membrane, particularly over extended periods of use. Other limitations arise in maintaining consistent flow through the ceramic membrane, particularly in grey water recycling and maintenance or lifetime of the ceramic membranes. In practical applications, this can result in limited recycling efficiency and yield. Other limitations relate to energy consumption due to the mechanical structure of the membrane.

It is desired too address or ameliorate one or more shortcomings or disadvantages associated with prior water treatment techniques, or to at least provide a useful alternative.

SUMMARY

Some embodiments relate to a water treatment apparatus including:
a ceramic filter; and
a flow apparatus operable to pass water through the ceramic filter in a forward direction so as to filter the water, the flow apparatus also operable to pass water through the ceramic filter in a reverse direction so as to remove material from the ceramic filter, whereby material having been deposited by filtration of the water is removed.

Such embodiments allow for the provision of a maintenance regime for ceramic filters which can be implemented in grey water recycling applications, and which is particularly suited to automation with simple devices for on-site grey water recycling.

The apparatus may include a water heater operable to heat water to pass through the ceramic filter. This aspect provides improved yield of recycled water and synergistically improved maintenance of the ceramic membranes which provides further improvements in yield and throughput.

The apparatus may include a controller operable to control the flow apparatus to pass water through the ceramic filter according to a maintenance schedule. The controller may be operable to read maintenance data defining the schedule.

The flow apparatus may include a forward-flow apparatus operable to provide the forward-flow and a reverse-flow apparatus operable to provide the reverse flow.

The reverse-flow apparatus may include a back-wash tank operable to receive permeate from the filter to provide water to the reverse-flow apparatus.

The reverse-flow apparatus may include a back-wash tank which is operable to be pressurised; pressure apparatus operable to pressurise the tank; and a backwash conduit connected to the ceramic filter such that when the backwash tank is pressurised, water from the backwash tank is provided to the ceramic filter in the reverse direction.

The apparatus may include an outlet conduit operable to direct a flow of filtered material once removed from the ceramic filter away from a path of water which would be provided to the ceramic filter in a forward direction. The outlet conduit may be operable to direct the filtered material to a tank which supplies water for the flow in the forward direction. The backwash conduit may be narrower than the outlet conduit.

The apparatus may include an inlet conduit operable to receive water to be filtered by passing through the ceramic filter in a forward direction.

Some embodiments relate to a water treatment apparatus comprising:
a ceramic filter operable to filter water passed through the ceramic filter; and a water heater operable to heat water to be filtered by the ceramic filter.

The apparatus of any of the above paragraphs may include a heater operable to heat water to be passed through the ceramic filter in a forward direction. The heater may be operable to heat the water to about 40 degrees or more. The heater may be operable to heat the water to about 50 degrees or more. The heater may be operable to heat the water to within a temperature range of 50 to 70 degrees. The heater may be operable to heat the water to about 60 degrees.

The apparatus of any of the above paragraphs may include a preliminary filter to filter water prior to it being passed through the ceramic filter, the preliminary filter comprising a vibrating membrane. The apparatus of any of the above paragraphs may include a carbon filter. The carbon filter may be operable to provide about 6 to about 12 minutes of contact between water to be filtered and carbon in the filter.

The apparatus of any of the above paragraphs may include a UV treatment apparatus to treat water with Ultra Violet light to disinfect the water.

The apparatus of any of the above paragraphs may include an ozone treatment apparatus operable to treat the water with ozone.

The apparatus of any of the above paragraphs may include a ph adjustment apparatus operable to adjust the pH level of water.

Some embodiments relate to a method to treat water including:

forcing water in a first direction through a ceramic membrane filter to remove material water from the water and provide filtered water; and forcing water in a second direction, being reversed with respect to the first direction, through the ceramic membrane filter to remove the material from the ceramic membrane filter.

The method may comprise forcing water in first and second directions alternately. The method may comprise forcing water in first and second directions according to a schedule.

The forcing of water in the second direction may include forcing the filtered water in the second direction.

The method may include storing filtered water and forcing the stored filtered water in the second direction.

The method may include heating water to be forced in the first direction.

Some embodiments relate to a process to treat water including:
heating water to be treated to provide heated water; and forcing the heated water through a ceramic membrane filter.

Some embodiments relate to a process to treat water including:
filtering water through a vibrating screen; and
subsequently forcing the water through a ceramic membrane filter.

Embodiments may involve any of the methods of paragraphs above applied to grey water to recycle the grey water.

Some embodiments relate to a computer readable carrier medium carrying computer executable code, the code operable when executed to configure a configurable device to control a water treatment apparatus to carry out the method of one of the paragraphs above.

Some embodiments relate to a computer system including:
a code memory operable to store processor executable code;
a processor operable to execute code stored in the code memory; and a data memory operable to store data,
wherein the code memory stores code, which when executed, causes the computer to control a water treatment apparatus to perform the method of one of the paragraphs above or causes the computer to configure a configurable device to control a water treatment apparatus to perform the method of one of the paragraphs above.

Some embodiments use the computer system as part of a computer-controlled water treatment system configured to perform the functions described herein.

DETAILED DESCRIPTION

Described embodiments relate generally to methods, systems and apparatus for water treatment and to systems and computer readable storage configured to control the performance of such methods, systems and apparatus. The water treatment may be grey water treatment for example, and the described embodiments are particularly suited to such purposes. For example, embodiments may be used as part of a larger industrial water usage process, such as for laundering laundry articles, where high throughput of water is required. Embodiments are not, however, limited to such use.

Figure 1:
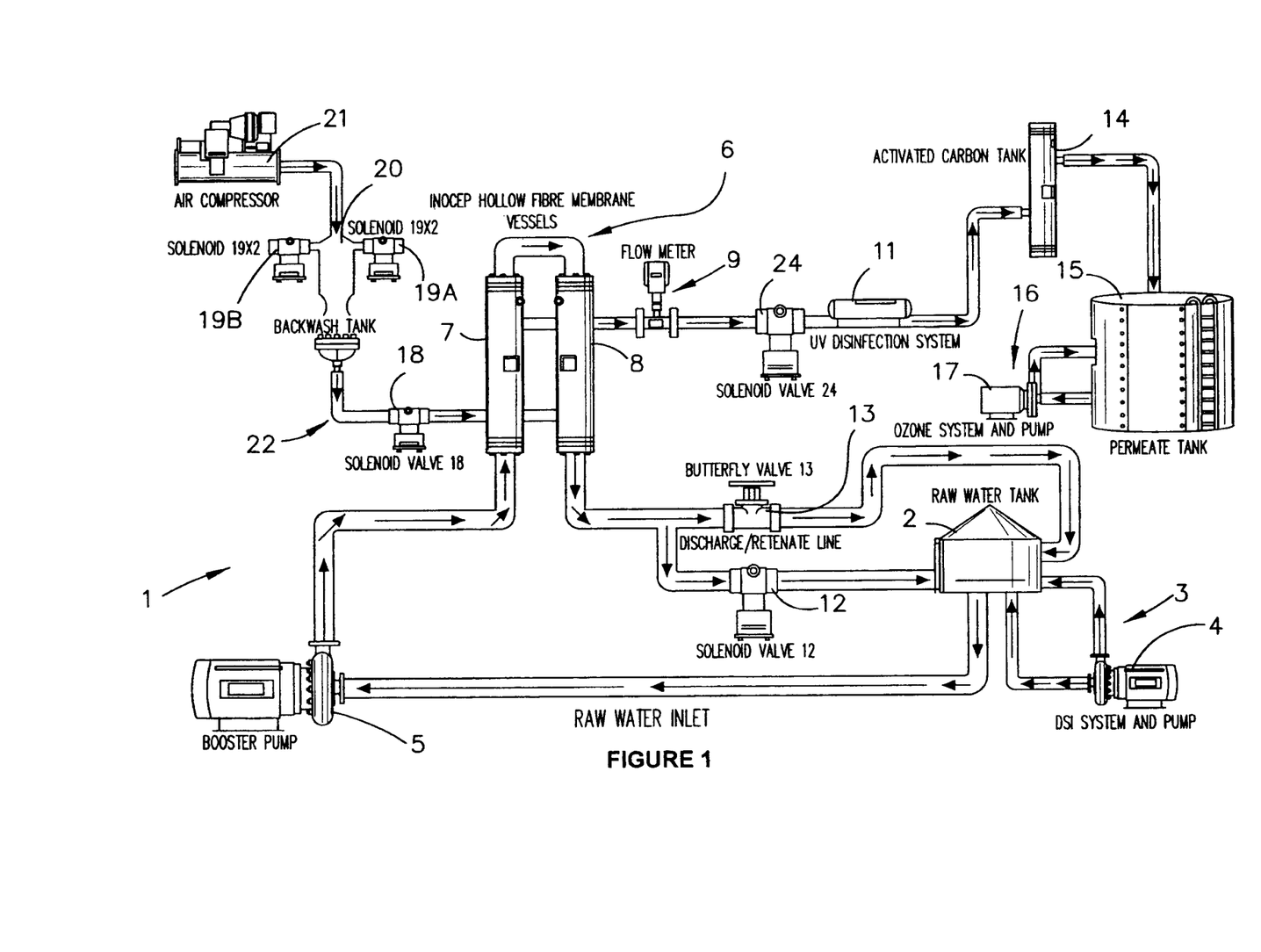
FIG. 1 is a schematic diagram of a water recycling apparatus according to some embodiments, with the apparatus shown in a normal operating mode.
Figure 5:
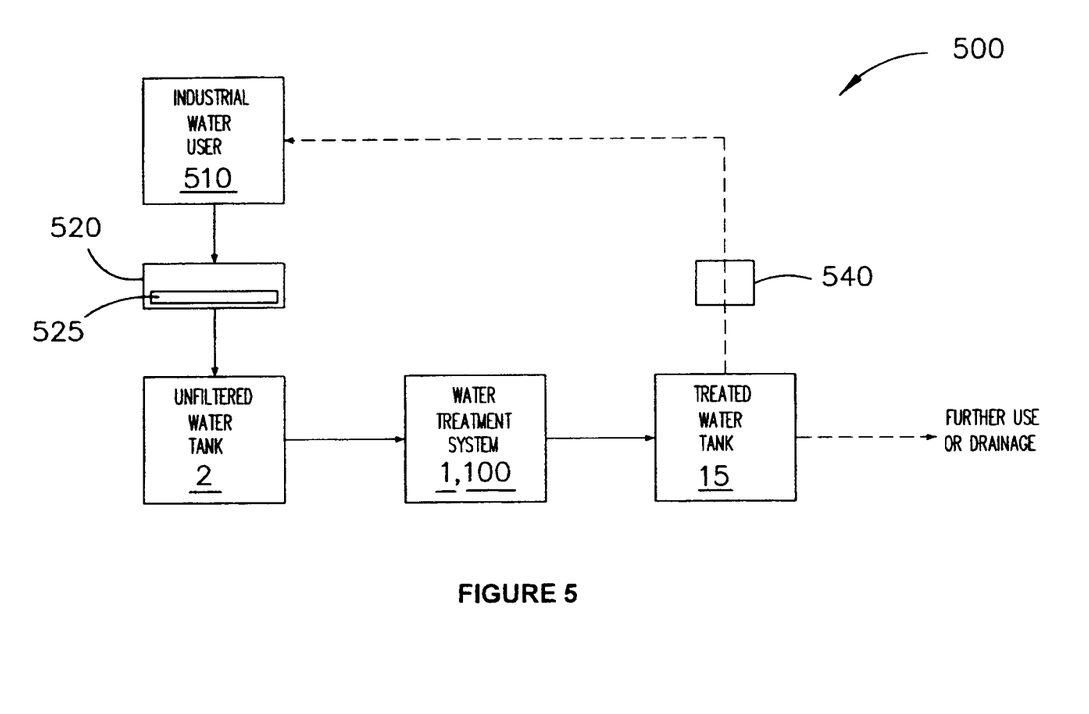
FIG. 5 is a block diagram of a water treatment system including the apparatus of FIGS. 1 and 2 and the control system of FIG. 4, forming part of an industrial water usage system.

FIG. 1 shows schematically a water treatment and recycling apparatus 1. The present embodiment shown in FIG. 1 is optimized for recycling of water from an undustrial water user 510, such as a commercial laundry facility, as part of a larger undustrial water usage system 500 (FIG. 5). Apparatus 1 is configured to output about 5000 litres of recycled water per hour. The system 500 has a raw water tank (2). Apparatus 1 thus acts as a secondary treatment apparatus for a larger apparatus or system that may comprise the raw water tank 2 as storage for its waste water. The raw water tank (2) may be dimensioned to act as a buffer tank between primary and secondary treatment apparatuses. The primary treatment apparatus 520, has a vibrating mesh filter 525 to remove, material such as fabric lint, suspended solids, hair, fibre, and foreign contaminants. The secondary treatment apparatus may comprise apparatus 1.

The vibrating screen 525 may be selected to remove contaminants which are greater than 70 micrometres in size. In other less preferred embodiments this may be 130 micrometres in size. It has been observed that vibrating screens, used for grey water applications, which allow contaminants larger than 70 micrometres to pass, allow the inlet of ceramic membrane filters in secondary apparatus to become blocked.

A temperature controller (3), for example in the form of a Direct Steam Injection (DSI) device and pump (4) draws off and returns water from the raw water tank (2) to maintain the water at a temperature above 40 degrees. The pump (4) may be a centrifugal pump able to draw water though the direct steam injection device and back into the raw water tank (2). Suitable DSI or other heating devices and pumps can be used for this function.

The temperature may be maintained by the temperature controller 3 at 60 degrees Celcius which is 10 degrees above the lowest temperature of water used by the commercial laundry for which water is recycled. This temperature provides improved efficiency of ceramic membranes used in the apparatus but involves minimal energy wastage as water is heated only 10 degrees above that required by the commercial laundry for its lowest temperature operation cycle. The improved efficiency of the ceramic membrane results in improved filtration and a higher percentage of the raw water being recycled. Alternative embodiments may use alternatives to direct steam injection for temperature control.

The raw water tank (2) feeds a booster pump (5). The booster pump (5) supplies water at pressure to a ceramic membrane filter (6) formed by two membrane vessels (7) and (8) connected in series. In this embodiment the membranes used in the ceramic membrane filter (6) is selected to have average membrane apertures of 0.1 micrometers. Other suitable membrane apertures will be apparent to the reader. Another embodiment may use an aperture size of 0.2 micrometres. Also in this embodiment the ceramic membrane filter (6) and pump are selected to cause 5000 litres of water per hour to be forced, or permeate, through the ceramic membrane at a surface rate of between 2 and 7 metres per second. In this specific embodiment, the rate of 2.35 metres per second has been selected. In other embodiments this rate is not selected so precisely as +/−0.05 metres per second. The ceramic membrane filter of this embodiment is a type with hollow ceramic fibres, such as INOCEP™ ceramic hollow fiber membranes. A flow meter (9) after the ceramic membranes filter measures the flow through the membrane. The apparatus has a permeate solenoid valve (24) connected to the flow meter (9) to control flow of the filtered water.

An Ultra Violet (UV) disinfection device (11) may be connected after (i.e. downstream of) the permeate solenoid valve (24). In embodiments configured to recycle 5000 litres per hour of water for commercial laundry use, the UV disinfection apparatus may have 2 or 4 1000 mm amalgam lamps (not shown). These lamps can generally tolerate water temperatures up to 90 degrees Celcius. Amalgam lamps also typically have a high operational lifetime, of up to 16000 hours. Additionally, amalgam lamps have been observed by the applicant to have a higher disinfection effectiveness than some alternative standard UV lamps.

In the embodiment shown, an activated carbon tank (14) is connected to the UV disinfection apparatus (11). In the carbon tank (14), the permeate is in contact with coal-based steam activated carbon meshes in unwashed granular form. The meshes (not shown) of this embodiment measure 12×40 mm. The amount of carbon in the tank 14 is chosen for the flow rate of the apparatus and the water quality required. The tank 14 of this embodiment is configured to provide between 6 and 12 minutes of contact for the water with the activated carbon. Contact with the activated carbon absorbs non-ionic surfactants, odours and any other small contaminants that may be left in the permeate water after filtration by the ceramic membrane filter. Suitable dimensions and amounts of material as well as types of material for given specific applications will be apparent to the person of ordinary skill in the art.

Figure 3:
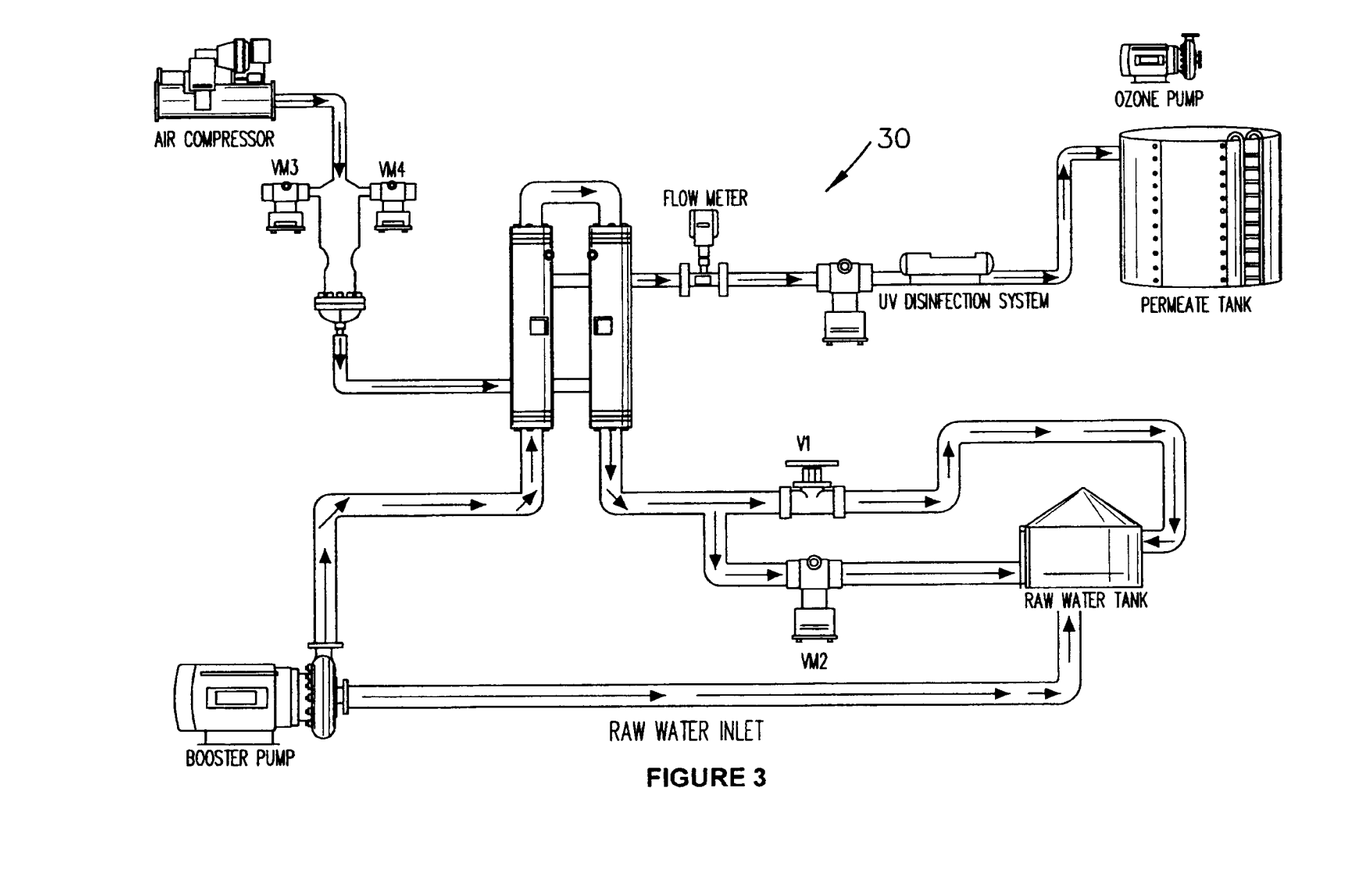
FIG. 3 shows a control interface screen used with a Programmable Logic Controller for the apparatus of FIG. 1 and FIG. 2.

The recycling apparatus (1) has a permeate (i.e. filtered and treated water) tank (15) connected to the activated carbon tank (14) to store treated water, or permeate. The permeate tank (15) has a level probe 150 (FIG. 4) which relays signals to a processor 115 of a controller 110 for the apparatus 1. The apparatus 1 may be controlled by a programmable logic controller (PLC) 110 which has a touch screen control interface 125, a display of which is shown in FIG. 3. A PLC is used in this context as just one example of a number of different computing devices that can be configured to control the operation of apparatus 1 as part of control system 100.

Referring again to FIG. 1, treatment and recycling apparatus 1 may have an ozone disinfection system (16) which is connected to the permeate tank (15) to draw off and return water, using a centrifugal pump (17), from the permeate tank 15 and to treat the drawn off water with ozone.

The apparatus 1 may have a pH controller 145 which doses permeate supplied from the tank with sulphuric acid ($H_2SO_4$) to neutralize alkalis in the grey water and maintain the permeate water at a pH of around 7. The pH controller 145 receives signals measured at intervals by a pH sensor probe 140 in the permeate tank 15.

A back-wash solenoid valve (18) connects the exit surfaces of the ceramic membranes in the vessels (7) and (8) to a back-wash tank 20 via suitable fluid conduits 22. Here exit surface refers to the membrane surface which water exits from, or permeates from, when the water is forced through the ceramic membrane in a forward direction. If water is forced from the back-wash tank 20 against the exit surfaces, it will be forced through the ceramic membranes in a reverse direction relative to normal filtering operation. The back-wash tank (20) is suitable for pressurizing when solenoid valves 19A and 19B are closed. An air compressor 21 is connected to the back-wash tank 20 to provide compressed air under the control of PLC 110 to pressurise the tank 20.

The back-wash tank 20 is connected to the membrane vessels (7) and (8) by a conduit 22 which is smaller in diameter than the conduit 23 which connects the membrane vessels (7) and (8) to the flow meter 9. For example, the back-wash conduit (22) may be 32 mm in diameter, compared to 50 mm diameter of the permeate conduit (23). This assists in maintaining back-wash pressure provided by the compressor (21). The back-wash tank can be filled with permeate when the solenoid valves (19) are open. This provides a supply of relatively clean water at a temperature which is close enough to the temperature of water in membrane vessels (7) and (8) as to minimize thermal shock to the ceramic membranes in the vessels (7) and (8). The back-wash tank 20 and back-wash piping 22 are configured so that back-wash water forced in a reverse direction through the ceramic membranes differs from the raw water being filtered by the ceramic membranes within a thermal shock tolerance for the ceramic membranes. In this case the thermal shock tolerance may be around 2 to 3 degrees Celsius.

The operation of the embodiment of the recycling apparatus (1) described with reference to FIG. 1 will now be described with the apparatus (10) in a normal mode of operation in which it recycles raw grey water in the raw water tank (2). The apparatus (1) may be activated by signals at a level probe 150 in the permeate tank (15) indicating to the controller 110 that the permeate levels are low.

Water from a primary treatment apparatus 520, and stored in the raw water tank 2, is heated and maintained at a temperature of 60 degrees by the Direct Steam Injection device (3). The raw water is then drawn from the tank by the booster pump 5 and through hollow ceramic fibre filters in the two ceramic filter vessels (7) and (8) in series at a pressure of 2.5 bar and at a rate at the membrane surface of 2.35 metres per second. Passing the raw water through the hollow ceramic fibre filter (6) removes particulates and contaminants to a size of 0.1 micrometres.

The water (i.e. filtered water, sometime referred to herein as "permeate") permeated through the hollow ceramic membrane filter (6) passes through the flow meter (9) which monitors the flow rate. In some embodiments signals from the flow meter (9) may be used by the controller 110 to adjust the operation of the booster pump (5). The permeate then passes through a permeate solenoid valve (24) which is open when the apparatus is in this normal operating mode. The permeate then passes through the UV disinfection device (11) which disinfects the permeate. Next, the permeate passes through the activated carbon tank (14) where it is in contact with the carbon for a time selected between 6 and 12 minutes on average. Next the permeate enters the treated water tank (15).

Treated water is then drawn by the centrifugal pump 17 through the ozone treatment apparatus and recycled back into the treated water tank (15).

In normal operation, the solenoid valve (18) connecting the backwash tank 20 to the hollow fibre ceramic filter vessels 7, 8 is closed, isolating water in the backwash tank 20 from the filter 6.

Figure 2:
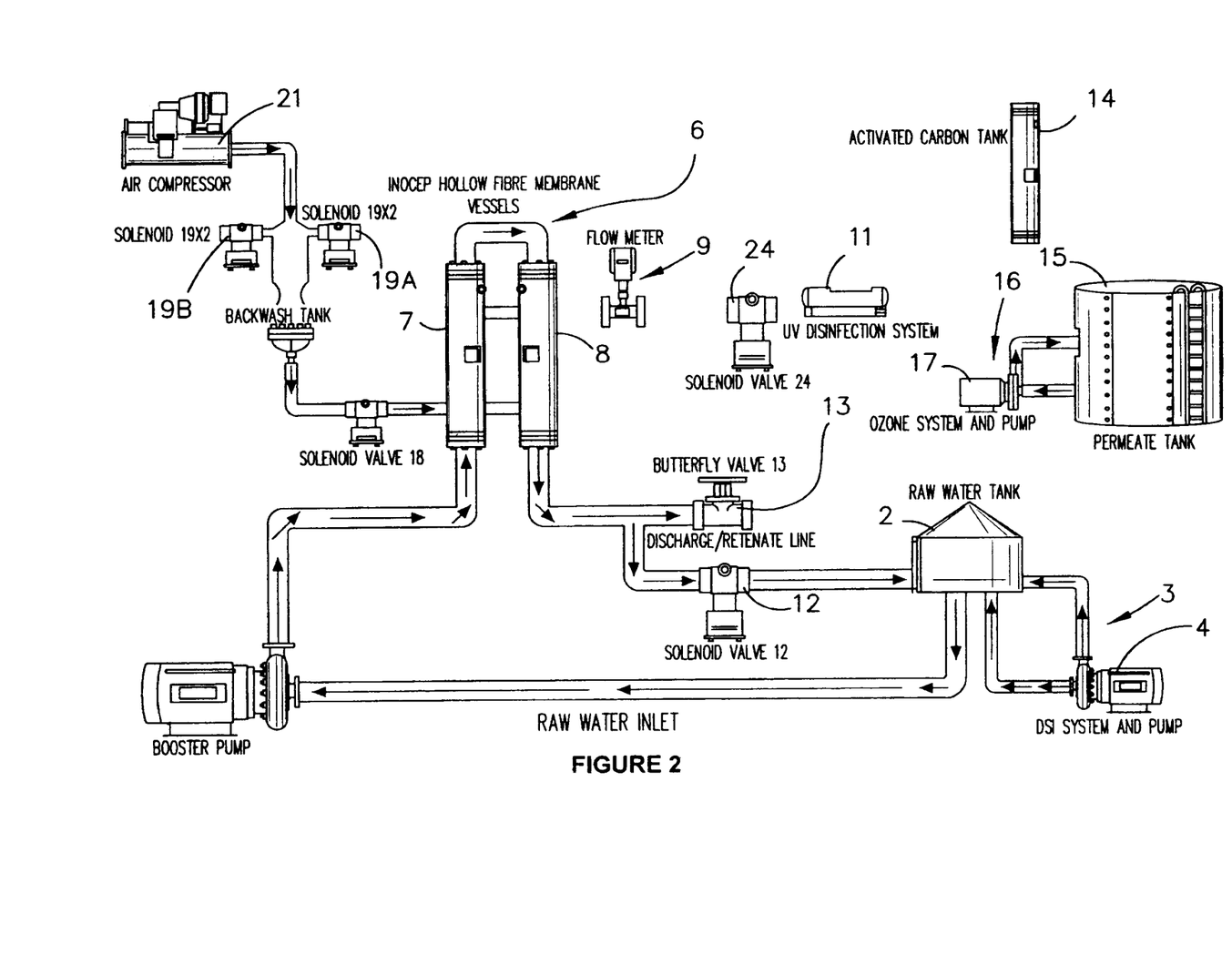
FIG. 2 is a schematic apparatus of the water recycling apparatus of FIG. 1, with the apparatus shown in a backwash mode of operation.

FIG. 2 shows the apparatus 1 of FIG. 1, with the apparatus 1 in a backwash mode of operation. In this mode of operation, permeate is forced through the hollow ceramic fibre filter vessels 7, 8 in a reverse direction relative to normal operation to remove a cake of material from the filter. In FIG. 2, sections of piping which are not involved are not shown for clarity. In the backwash mode of operation, the booster pump (5) works as normal. The permeate line solenoid valve (24) closes to isolate the ceramic membrane filter unit (6) from the permeate tank (15). The raw water solenoid valve (12) connecting the ceramic hollow fibre filters to the raw water tank opens and the solenoid valves (19A and 19B) open.

The back-wash solenoid valve (18) connecting the back wash tank (20) to the membrane vessels (7) and (8), housing the ceramic hollow fibre filters, is opened. This allows permeate water to be forced into the ceramic hollow fibre filters in a reverse direction to normal under air pressure in backwash tank (20) provided by the air compressor (21). In this embodiment, a pressure of about 3 bar is provided for a period of around 10 seconds. The reverse flow of permeate removes a cake layer from the ceramic membrane surface. In alternative embodiments, other sources of relatively clean water may be used in place of permeate provided by the back wash tank 20. Because the solenoid valve (12) is open, insufficient pressure for the forward direction of water flow is generated for the back-washed material to permeate the membrane. Therefore, the cake layer and back-wash water is forced into the raw water tank under pressure of the booster pump (5).

Next, the solenoid valves (19A and 19B) close but the backwash solenoid valve (18) remains open. This causes the back-wash tank to refill with permeate for use in the next cycle of back wash operation, or procedure. In this embodiment, the recycling apparatus (1) remains in this state for 45 seconds, although other suitable durations for given installations of the apparatus 1 may be employed.

Next the backwash solenoid valve (18) and the solenoid valve (12) close. Raw water is again forced through the hollow ceramic membrane filter (6) to filter the raw water. Filtration outlet solenoid valve (24) opens to allow permeate to pass through the UV disinfection apparatus, the activated carbon tanks and to the permeate tank.

FIG. 3 shows an example display screen displayed to an operator by the touch screen (30) user interface 125 of the PLC controller 110 of control system 100. The touch screen (30) displays the various devices and apparatuses forming the recycling apparatus (1) and displays screens of various operating conditions and parameters and allows the operator to monitor and adjust the operation, and maintenance schedules of the recycling apparatus (1). The controller 110 uses received signals from various components of system 100 to activate the components of apparatus 1 when required by the level, or amount, of water in the permeate tank. Another probe (not shown) may be connected to an electronic solenoid which is connected to a mains water supply as a back-up or supplement to supply of recycled water from the apparatus, so that a constant rate of water supply can be supplied to the industrial water user 510. The apparatus may also have dual pressure set transfer pumps 540 connected to the permeate tank (15) to supply water from the pump 540 to the industrial water user 510.

In described embodiments, the apparatus 1, less the tanks 2 and 15 may be skid-mounted for portability.

Figure 4:
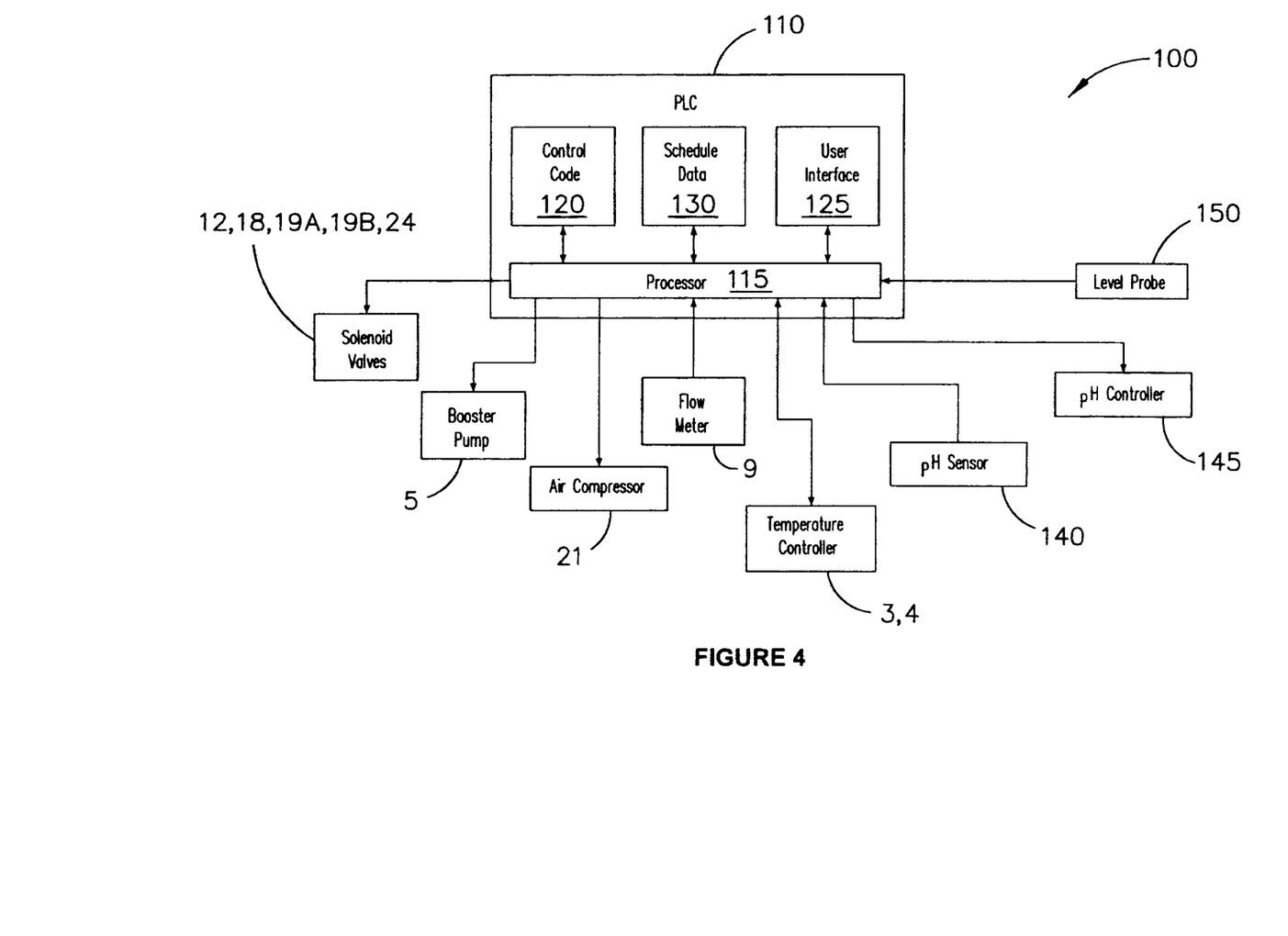
FIG. 4 is a block diagram of a control system to control operation of the apparatus of FIGS. 1 and 2.

FIG. 4 shows a control system 100 having a controller in the exemplary form of PLC 110. The PLC 110 has memory including program code executable by a processor 115 of the PLC 110, where the program code comprises control code 120 to configure the PLC to perform the control functions described herein, schedule data to indicate a maintenance schedule by which the ceramic filter is to undergo its periodic self-cleaning purge, and a user interface module that cooperates with the touch screen 30 to provide user interface functionality.

Other embodiments provide a computer readable carrier medium carrying computer executable code, the code operable when executed to configure a configurable device to control a water treatment apparatus to carry out methods desired herein. The configurable device may comprise Programmable Logic Controller (PLC) 110. The carrier may include a data or information transmission medium such as telephonic transmission media, radio transmission medium, and include data or transmission formats including TCP/IP, telnet, FTP or other transmission formats known to the reader. The carrier medium may include data storage on which is stored the control code 120, user interface 125 and/or maintenance schedule data 130. The storage medium or media may include volatile or non-volatile memory, magnetic or optical media, EEPROM, or any other suitable storage media.

Some embodiments provide a water recycling system which provides high recycling yields for grey water using ceramic membrane filters by heating the grey water to be filtered to take advantage of the applicant's observation that raised temperatures, particularly about 40 degrees Celsius or more, improve the effectiveness of ceramic membrane filters and/or allow these filters to provide effective filtration at more consistent flow rates.

Some embodiments provide efficient operation of recycling for industrial plant by using ceramic membrane filters and heating water to a temperature which balances i) a tendency observed by the applicant for filtering of water by ceramic membrane filters to have a higher efficiency and more consistent operation at higher temperature and ii) energy wastage if the water is heated above a temperature required by the industrial plant.

Some embodiments provide a water recycling system which provides high throughput and/or filter life by providing a reverse flow through the ceramic membrane filters to remove material deposited by the filtration action.

Some embodiments provide grey water recycling using ceramic membrane filters in combination with a vibrating screen filter.

Some embodiments provide grey water recycling using ceramic membrane filters in combination with a vibrating screen filter and a water heater to control the temperature of water filtered by the ceramic membrane filter to provide improved recycling rates. Other embodiments are adapted from the embodiments described herein to treat water that is not necessarily grey water. Other embodiments are adapted from the embodiments herein to treat liquids other than water.

Throughout the specification, the aim has been to describe embodiments without limiting the invention to any one embodiment or specific collection of features. Persons skilled in the relevant art may realize variations from the specific embodiments that will nonetheless fall within the scope of the invention. Additionally, further embodiments may be formed of suitable combinations of features described herein. It will be appreciated that various other changes and modifications may be made to the embodiments described without departing from the spirit and scope of the invention.

The invention claimed is:

1. Water treatment apparatus, comprising:
   a) a source of raw water to be treated;
   b) one or more ceramic membrane vessels, each said vessel having multiple ceramic membrane filters;

c) a raw water influent flow line that transmits raw water from the said raw water source to said one or more vessels;

d) a flow apparatus that includes a booster pump, said flow apparatus operable to pass raw water through said one or more vessels in a forward direction in a first, filtration cycle that accumulates material to be filtered on said ceramic membrane filters so as to filter the water that was transmitted to said one or more vessels via said raw water influent flow line;

e) wherein during said first, filtration cycle, raw water from said raw water influent flow line flows through said ceramic membrane filter or filters depositing a concentrate filtered material on said membrane filters;

f) a permeate flow line that transmits filtered fluid from the ceramic vessel or vessels to a permeate tank;

g) a raw water return flow line that enables transmission of raw water from the filter or filters to the raw water source, said raw water return line having a raw water return valve;

h) a backwash tank;

i) a backwash flow line that transmits backwash fluid from the backwash tank to said vessels during a second, backwash cycle;

j) a compressor that pressurizes the backwash tank;

k) a backwash valve in said backwash flow line that can be opened and closed;

l) a permeate valve in said permeate flow line that valves fluid flow between said ceramic vessels and said permeate tank, said permeate valve having open and closed positions;

m) wherein during said backwash cycle, the permeate valve is in the closed position and raw water is pumped via the raw water influent flow line to said vessels;

n) wherein the ceramic membrane filters are ceramic hollow fiber membrane filters; and o) wherein each said ceramic hollow fiber membrane filter has a filter wall surrounding a central bore and during the filtration cycle raw water is connected to and enters said bore and flows radially through said filter wall.

2. The apparatus of claim 1, further comprising a temperature controller configured to control the temperature of the water between 40 degrees Celsius and 70 degrees Celsius.

3. The apparatus of claim 1, wherein the raw water passes through the ceramic membrane filters at a pressure between 2 and 3 bar and at a rate between 2 and 3 meters per second.

4. The apparatus of claim 1 in which the second, backwash cycle is maintained for between 30 and 60 seconds.

5. The apparatus of claim 3, wherein the backwash tank receives filtered water to provide filtered water for backwash during the second, backwash cycle.

6. The apparatus of claim 1, wherein there is only one booster pump in said raw water influent flow line, positioned in said raw water influent flow line in between said raw water source and said one or more vessels.

7. The apparatus of claim 1, wherein there are two said vessels connected in series.

8. The apparatus of claim 1, wherein flow during said second, backwash cycle includes: 1) backwash flow from the backwash tank to said vessels in a backwash direction that dislodges concentrate filtered material from said ceramic membrane filters central bore and 2) said booster pump simultaneously pumping of fluid to the ceramic membrane filters via said raw water influent flow line and through said ceramic vessels to force the concentrate filtered material that was dislodged by the backwash flow in said vessels to said raw water source via the raw water return flow line.

9. The apparatus of claim 1, further including a preliminary filter to filter water prior to it being passed through the ceramic membrane filters, the preliminary filter comprising a vibrating membrane.

10. The apparatus of claim 1, further including a carbon filter downstream of said vessels.

11. The apparatus of claim 10, wherein the carbon in the carbon filter contacts the water to be filtered for a time period of between 6 to 12 minutes.

12. The apparatus of claim 1, further including an ultraviolet treatment apparatus downstream of said vessels.

13. The apparatus of claim 1, further including an ozone treatment apparatus downstream of said vessels.

14. The apparatus of claim 1, further including a pH adjustment apparatus operable to adjust the pH level of filtered water.

15. The apparatus of claim 14, wherein downstream of said vessels the pH adjustment apparatus maintains the pH level between 6 and 8.

16. The apparatus of claim 8, wherein the raw water return valve is open so that insufficient pressure for the forward direction of water flow is generated for the concentrate filtered material to permeate the membrane.

17. The apparatus of claim 1, wherein during the backwash cycle, backwash water flows through said filter wall to said bore to dislodge concentrate filtered material from said wall inner surface and fluid flows via said raw water influent flow line to said bore of each said hollow fiber ceramic filter to carry away the dislodged concentrate filtered material from said filters.

18. The apparatus of claim 1, wherein the backwash flow line has a smaller diameter than the permeate flow line.

* * * * *